United States Patent [19]

Takai et al.

[11] Patent Number: 5,402,473
[45] Date of Patent: Mar. 28, 1995

[54] COMMUNICATION DEVICE AND DATA TRANSMITTING METHOD

[75] Inventors: Mamoru Takai, Suita; Akira Hasebe, Takatsuki, both of Japan

[73] Assignee: Megasoft, Inc., Japan

[21] Appl. No.: 45,516

[22] Filed: Apr. 8, 1993

[30] Foreign Application Priority Data

May 19, 1992 [JP] Japan .................................. 4-125821

[51] Int. Cl.⁶ .......................................... H04M 11/00
[52] U.S. Cl. ........................................ 379/93; 379/98; 375/222; 375/356; 375/357; 375/377
[58] Field of Search ................ 379/98, 97, 93; 375/8, 375/121, 7, 107, 108

[56] References Cited

U.S. PATENT DOCUMENTS 4,317,221  2/1982  Toya ......................................... 375/7
5,065,408  11/1991  Gillig ....................................... 375/8

Primary Examiner—Curtis Kuntz
Assistant Examiner—Stella L. Woo
Attorney, Agent, or Firm—Merchant, Gould, Smith, Edell, Welter & Schmidt

[57] ABSTRACT

On receiving a digital signal from a computer (2), a frequency detector (28) determines a transmitting speed for computer (2). When the computer (2) has an operating frequency of 7.9872 of MHz, a speed other than one of the standardized speeds is selected to implement communication between the computer (2) and the frequency detector (28) at a speed of more than 9600 bps. To do this communication, the frequency detector (28) has a table for obtaining the speed other than one of the standardized speeds.

12 Claims, 7 Drawing Sheets

FIG. 1 (Prior Art)

| FIRST REFER-ENCE CLOCK (Hz) | DIVISION NUMBER | DATE SIGNAL SPEED (bps) |
|---|---|---|
| 5529600 | 512 × 36 | 300 |
| | 256 × 36 | 600 |
| | 128 × 36 | 1200 |
| | 64 × 36 | 2400 |
| | 32 × 36 | 4800 |
| | 16 × 36 | 9600 |
| | 8 × 36 | 19200 |
| | 4 × 36 | 38400 |
| | 2 × 36 | 76800 |
| | 1 × 36 | 153600 |

FIG. 2 (Prior Art)

| SECOND REFER-<br>ENCE CLOCK (Hz) | DIVISION<br>NUMBER | TRANSMITTING<br>SPEED (bps) |
|---|---|---|
| 153600 | 512 | 300 |
|  | 256 | 600 |
|  | 128 | 1200 |
|  | 64 | 2400 |
|  | 32 | 4800 |
|  | 16 | 9600 |
|  | 8 | 19200 |
|  | 4 | 38400 |
|  | 2 | 76800 |
|  | 1 | 153600 |

FIG. 3 (Prior Art)

| SECOND REFER-<br>ENCE CLOCK (Hz) | DIVISION<br>NUMBER | TRANSMITTING<br>SPEED (bps) |
|---|---|---|
| 124800 | 416 | 300 |
|  | 208 | 600 |
|  | 104 | 1200 |
|  | 52 | 2400 |
|  | 26 | 4800 |
|  | 13 | 9600 |
|  | unable | 19200 |
|  | unable | 38400 |
|  | unable | 76800 |
|  | unable | 153600 |

| | PHASE DIFFERENCE |
|---|---|
| 0 0 1 | 0° |
| 0 0 0 | 45° |
| 0 1 0 | 90° |
| 0 1 1 | 135° |
| 1 1 1 | 180° |
| 1 1 0 | 225° |
| 1 0 0 | 270° |
| 1 0 1 | 315° |

| FIRST REFER-<br>ENCE CLOCK (Hz) | DIVISION<br>NUMBER | DATE SIGNAL<br>SPEED (bps) |
|---|---|---|
| 5990400 | 19968 | 300 |
| | 9984 | 600 |
| | 4992 | 1200 |
| | 2496 | 2400 |
| | 1248 | 4800 |
| | 624 | 9600 |
| | 312 | 19200 |
| | 156 | 38400 |
| | 78 | 76800 |
| | 39 | 153600 |

| FIRST REFER-ENCE CLOCK (Hz) | DIVISION NUMBER | DATE SIGNAL SPEED (bps) |
|---|---|---|
| 5990400 | 19968 | 300 |
| | 9984 | 600 |
| | 4992 | 1200 |
| | 2496 | 2400 |
| | 1248 | 4800 |
| | 624 | 9600 |
| | 384 | 15600 |
| | 288 | 20800 |
| | 192 | 31200 |
| | 144 | 41600 |
| | 96 | 62400 |
| | 48 | 124800 |

COMMUNICATION DEVICE AND DATA TRANSMITTING METHOD

BACKGROUND OF THE INVENTION

1. Field of the Invention

The present invention relates to digital data transmission using modems and more particularly, to adjustment in transmitting speed thereof.

2. Description of the Prior Art

A telephone line is used as a transmitting line of communication between computers. Since the telephone line is arranged for transmitting human voice, only signals having audio frequency, i.e., 300 Hz through 3000 Hz can be transmitted. Since digital signals from a computer 2 (see FIG. 10) have a pulse form, digital signals can not be transmitted through the telephone line.

A modem modulates the digital signals so that they have audio frequency and then the modulated signals are sent through the telephone line to an opposite modem connecting to an opposite computer. In this modulation, distinguishing between a logic "1" level and a logic "0∞" level is effected by using phase difference. The opposite modem demodulates the modulated digital signals and the demodulated digital signals are sent to the opposite computer 8. Thus, modems are used to effect modulation and demodulation.

Under requirements from the Electronic Industries Association (EIA), data signal speed through the telephone line is fixed at a multiple of 300 bits per second (bps). Specifically, these are 300, 1200, 2400, 4800, 9600, 19200, 38400 bps.

Figure 1:
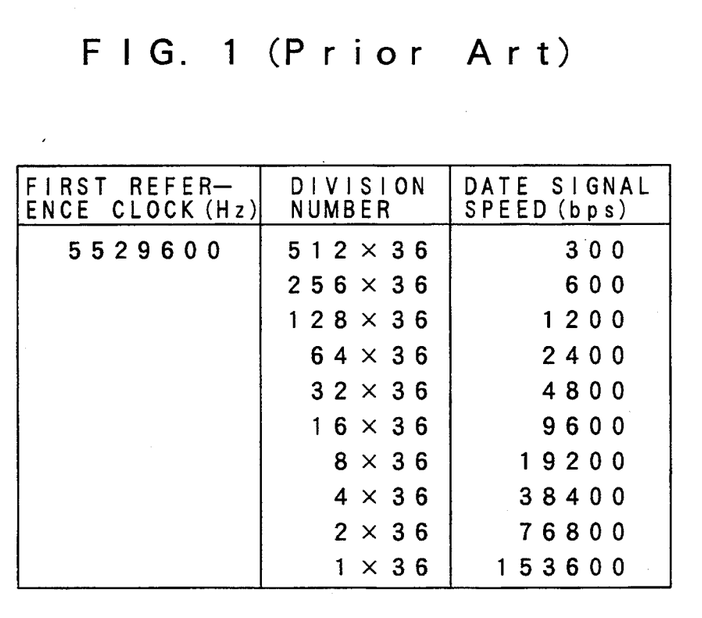
FIG. 1 is a table showing the relation between the first reference clock of 5.296 MHz and various division numbers.

Data signal speed depends on the frequency of the "transmitting speed clock". "Transmitting speed clock" is determined by how many pieces the first reference clock can be divided into. The relation between the first reference clock of 5.296 MHz and various division numbers is shown in FIG. 1.

Figure 2:
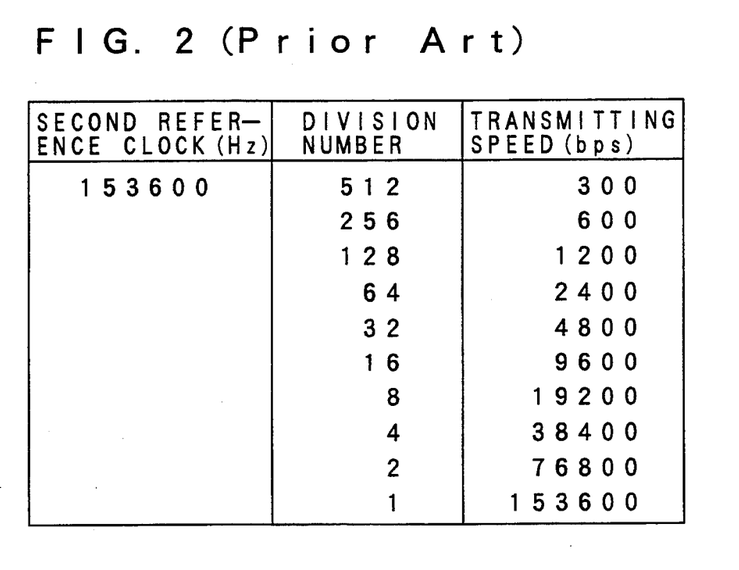
FIG. 2 is a table showing the relation between the second reference clock of 153600 Hz and various division numbers.

Similarly, transmitting speed in a computer is determined by how many pieces a second reference clock of the computer is divided into. When, for example, the computer has an operating frequency of 9.8304 MHz, the second reference clock is 153600 Hz. Therefore, the relation between the second reference clock of 153600 Hz and various division numbers is shown in FIG. 2. Referring to FIG. 2, data signal speeds of 300, 600, 1200, 2400, 4800, 9600, 19200, 38400, 76800 and 153600 bps can be obtained using the division numbers of FIG. 2.

However, the described-above prior art includes the following problem.

Figure 3:
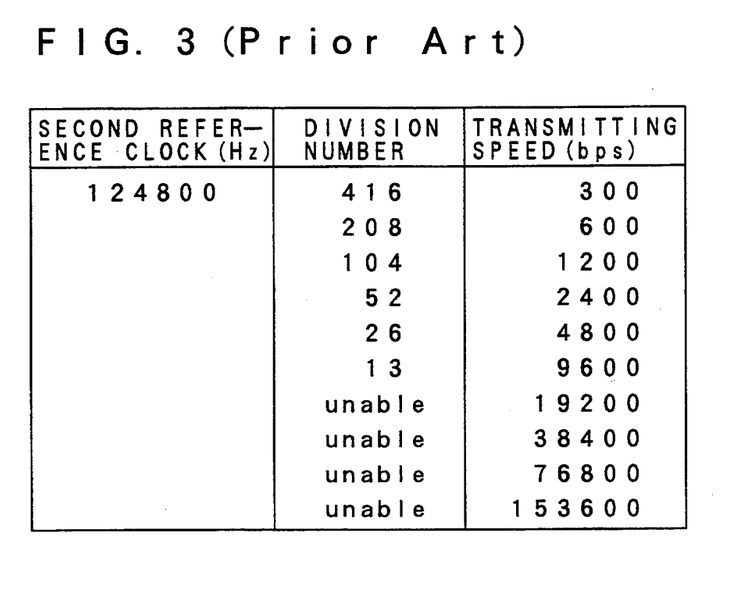
FIG. 3 is a table showing the relation between the operating frequency clock of 7.9872 MHz and various division numbers and desired data.

Personal computers on the market have an operating frequency of 7.9872 MHz, not the operating frequency of 9.8304 MHz. FIG. 3 shows the relation between various division numbers and the desired data signal speeds of 300, 600, 1200, 2400, 4800, 9600, 19200, 38400, 76800 and 153600 bps when a personal computer has the operating frequency of 7.9872 MHz. Apparently from FIG. 3, data transmission can not be completed at each of data signal speeds of 19200, 38400, 76800 or 153600 bps when the personal computer has the operating frequency of 7.9872 MHz (or the second reference clock is 124800 Hz).

SUMMARY OF THE INVENTION

It is an object of the present invention to provide a communication system which is able to transmit data through the telephone line at each of the standardized data signal speeds.

According to an embodiment of the present invention, a communication device having a first reference clock which connects with both a digital data processing device having a second reference clock and an opposite digital data processing device via a telephone line comprises:

a) a first and a second dividing means for dividing the first reference clock according to a respective order signal, the first dividing means outputting the divided clock to use the divided clock as a first transmitting speed clock and the second dividing means outputting the divided clock to use the divided clock as a second transmitting speed clock wherein the frequency of the first second transmitting speed clock is a divisor of the frequency of the first reference clock of the digital data processing device and is more than the frequency of the second transmitting speed clock, and the frequency of the second transmitting speed clock is one of the standardized data signal speeds through the telephone line, b) first device side communication means which is able to communicate digital signals with the digital data processing device at a speed determined by the incoming first transmitting speed clock, and c) second line side communication means having means for modulating incoming digital signals and sending the modulated signals through a telephone line to the opposite device and means for demodulating incoming modulated signals.

According to another embodiment of the present invention, a communication method using a communication device having a first reference clock, a first dividing means, a second dividing means, first device side communication means and second line side communication means, the communication device connecting with both a digital data processing device having a second reference clock and an opposite digital data processing device via a telephone line, the communication method comprises steps of:

a) creating and sending a first transmitting speed clock to the first device side communication means by using the first dividing means, and creating and sending a second transmitting speed clock to the second line side communication means by using the second dividing means, the first and the second transmitting speed clocks being obtained by dividing the first reference clock according to an order signal, b) communicating with the digital data processing device at a speed according to the received first transmitting speed clock by using the first device side communication means, and c) modulating incoming digital signals and sending the modulated signals to the telephone line, demodulating incoming modulated signals, at a speed according to the received second transmitting speed clock by using the second line side communication means.

The above, and other objects, features and advantages of the present invention will become apparent from the following description read in conjunction with the accompanying drawings, in which like reference numerals designate the same elements.

DETAILED DESCRIPTION OF THE EMBODIMENTS

Figure 4:
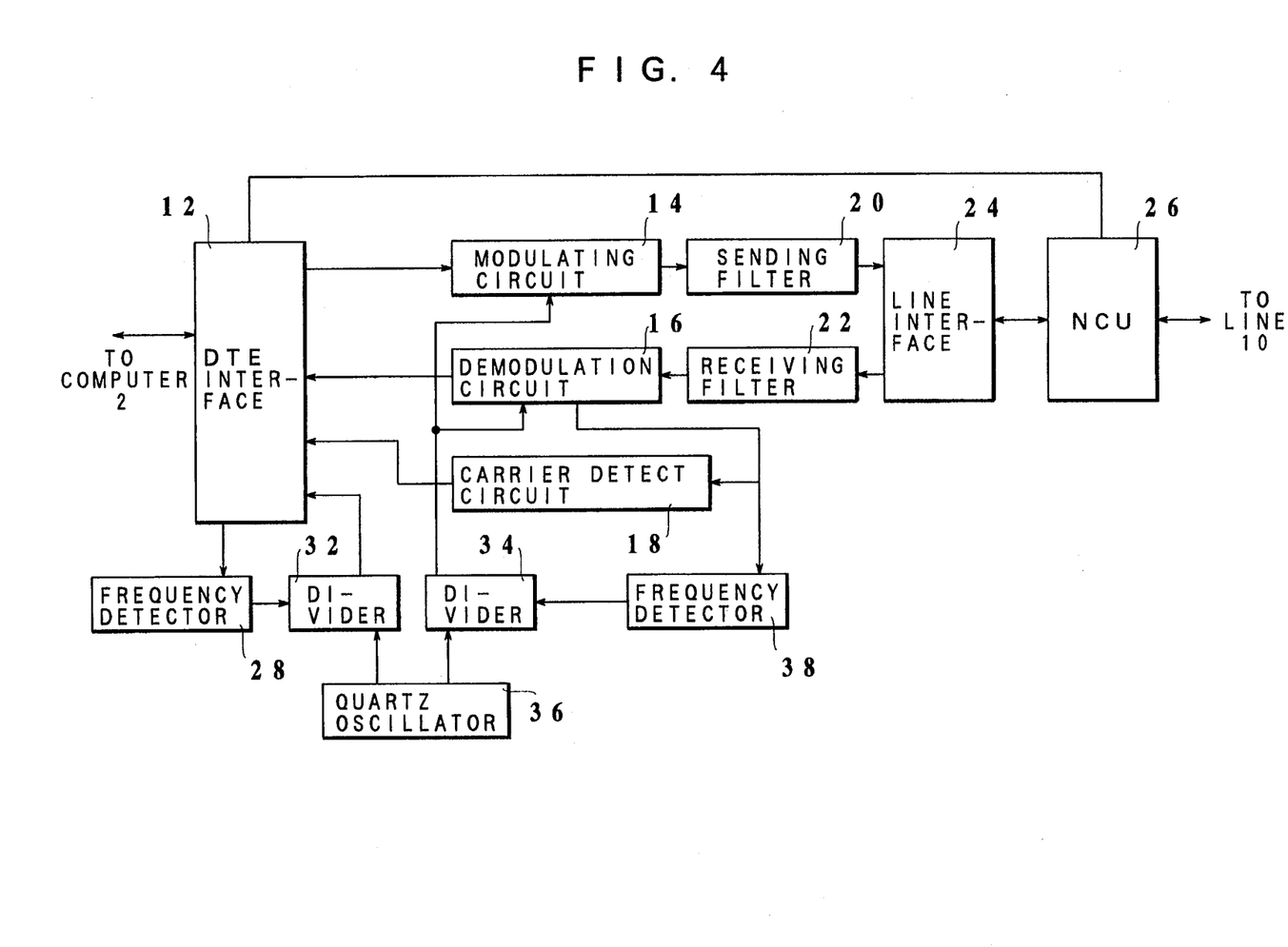
FIG. 4 is a schematic block diagram showing a modem according to an embodiment of the present invention.
Figure 10:
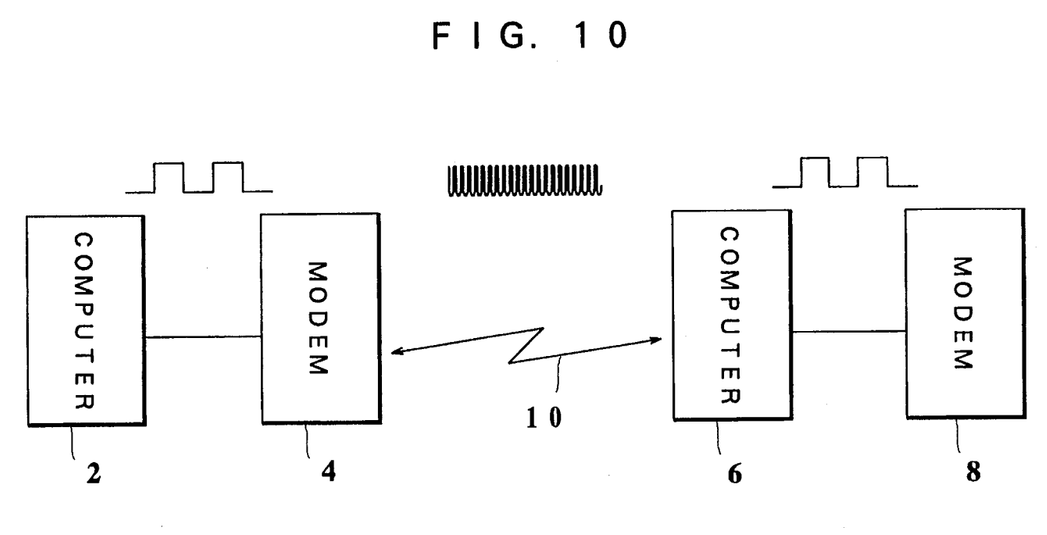
FIG. 10 is view showing communication between two computers using modems.

FIG. 4 shows a modem of a communication device according to an embodiment of the present invention. This modem is necessary to implement communication between a computer 2 which is a digital data processing device and an opposite computer 8 which is a digital data processing device as shown in FIG. 10. In the alternative embodiments, the modem may be used to implement communication between a computer and a facsimile machine, or, two facsimile machines.

The modem comprises a first and a second dividing means, device side communication means and line side communication means. The device side communication means includes a data terminal equipment (DTE) interface 12. The line side communication means includes a modulating circuit 14, a demodulation circuit 16, a carrier detect circuit 18, a sending filter 20, a receiving filter 22, a line interface 24 and a network control unit 26.

The data terminal equipment (DTE) interface 12 is connected with a terminal RS-232C for serial data transmission and thereby can communicate digital signals with the computer 2. Digital signals from the computer 2 enter the modulating circuit 14 through the DTE interface 12. In the modulating circuit 14 digital signals are modulated to have audio frequency. For example, digital signals of FIG. 5A are changed the audio frequency signals of FIG. 5B.

In the modulated signal of this embodiment, distinguishing between a logic "1" level and a logic "0" level is effected by using phase difference. Specifically, assume a basic analog signal is used to show a digital data "001". Then, the phase of the analog signal is shifted by 45° to show a digital data "000", the phase of the analog signal shifted by 90° is used to show a digital data "010", . . . , and phase of the basic analog signal shifted by 315° is used to show a digital data "101". For example, in a signal of FIG. 5B, the digital data "100" (see FIG. 5AX) is shown by shifting the basic analog signal by 270° at a location pointed by B1 and the digital data "101" (see FIG. 5AY) is shown by shifting the basic analog signal by 315° at a location pointed by B2.

After noise signals are removed from such modulated signals by the sending filter 20, the modulated signals are sent to a telephone line 10 through the line interface 24 and the network control unit 26 (NCU hereinafter).

Figure 5:
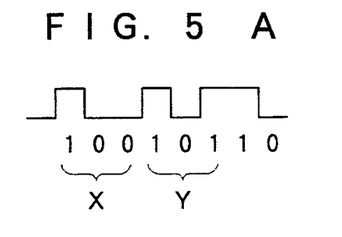
FIG. 5A is a waveform showing a digital signal.
FIG. 5B is a view showing a signal of audio frequency obtained by modulating the digital signal of FIG. 5A.
FIG. 5C is a table showing the relation between various digital signals and phase difference.

On the other hand, when NCU 26 receives the signals of audio frequency of FIG. 5B, NCU 26 sends these signals to the receiving filter 22 through the line interface 24. After the receiving filter 22 removes noise from the signals, the demodulation circuit 16 demodulates the signals. That is, digital signals of FIG. 5B are changed into the audio frequency signals of FIG. 5A. The demodulated signals are sent to the computer 2 through the DTE interface 12. Note that the carrier detect circuit 18 is used to detect carriers.

A quartz oscillator 36 having means for generating the first reference clock(s) generates the first reference clock(s) with frequency of 5.9904 MHz. This first reference clock is applied to both a first divider 32 and a second divider 34, which are means for dividing a first reference clock, which the modem has. The first divider 32 divides the first reference clock by a division number according to an order signal derived from a frequency detector 28 and then the divided clock is given to the DTE interface 12 to use as a first transmitting speed clock. Therefore, communication speed between the DTE interface 12 and the computer 2 is determined by the first transmitting speed clock.

Meanwhile, the second divider 34 divides the first reference clock by a division number determined by a frequency detector 38 and then the divided clock is given to both the modulating circuit 14 and the demodulation circuit 16 to use as a second transmitting speed clock. Therefore, transmitting speed through the line 10 is determined by the second transmitting speed clock.

Figure 6:
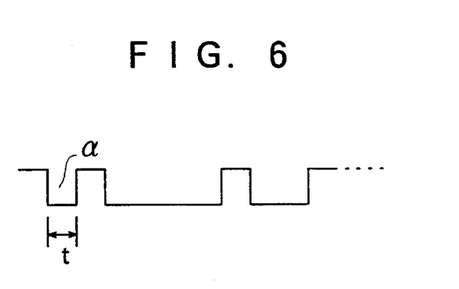
FIG. 6 is the view showing a pulse width t of start bit α used to determine the data signal speed through the line 40.
Figure 7:
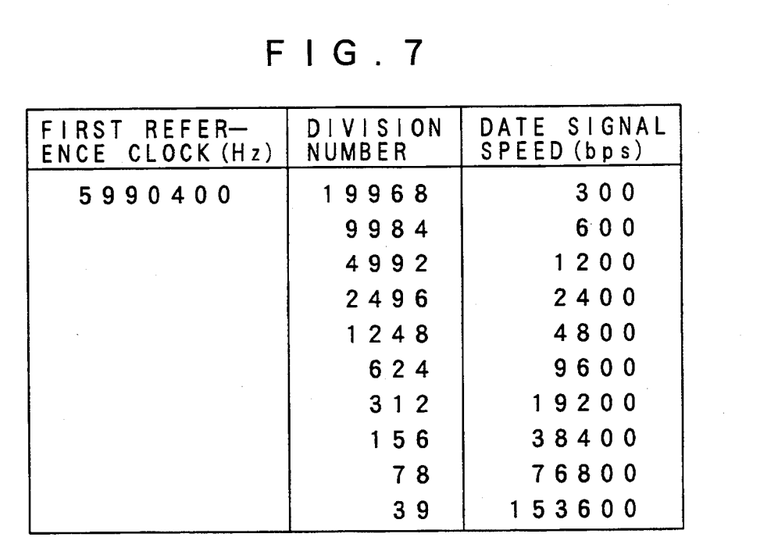
FIG. 7 is a table showing division numbers for dividers 32 and 34.

Next operations of the frequency detector 38 will be described. The frequency detector 38 distinguishes transmitting speed through the line 10 from digital signals modulated by the modulation circuit 16. Specifically, this judgement is effected by measuring the pulse width t of start bit α of command "AT" derived from the opposite computer 8 in order to detect the data signal speed through the line 40 (see FIG. 6). When the pulse width t of start bit is 104 micro second, the data signal speed through the line 40 is to be 9600 bps. Therefore, the frequency detector 38 sends the division number 624 to the divider 34 according to the detected data signal speed of 9600 bps. These operations enable communication at the transmitting speed of 9600 bps. FIG. 7 shows the relation between the data signal speed and the division number. Note that the frequency detector 38 can judge correct data signal speed even when there is a margin of only a few percent in measuring value because data signal speed is standardized.

Figure 8:
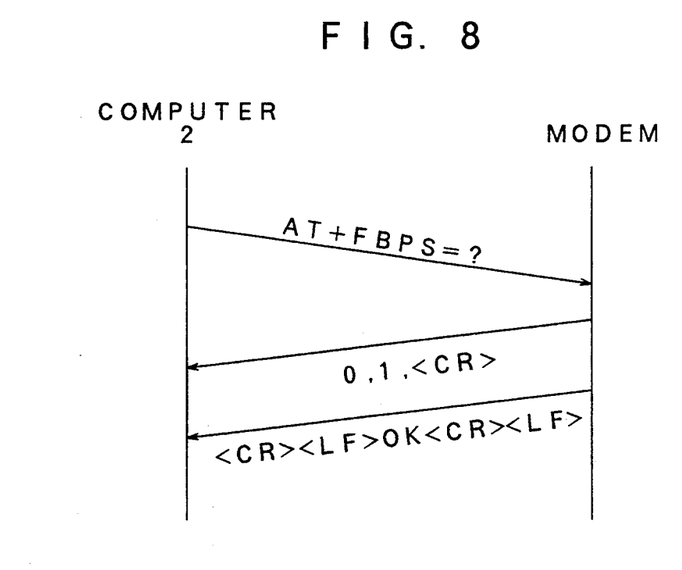
FIG. 8 is a view showing communication between computer 2 and the modem.

Now, operation of the frequency detector 28 will be described when, for example, the computer 2 has a second reference clock of 124800 Hz (or an operating reference clock of 7.9872 MHz), the frequency detector 28 receives from the computer 2 a question signal "AT+FBPS=?" to asks whether communication between the frequency detector 28 and the computer 2 is performed at a speed other than one of the standardized speeds (see FIG. 8).

The modem in this embodiment can implement communication with the computer 2 at a speed other than one of the standardized speeds. Therefore, the frequency detector 28 sends an answer signal 0,1<CR> and an answer signal <CR><LF>OK<CR><LF> to the computer 2 in order to show that communication between the frequency detector and the computer 2 can be performed at a speed other than one of the standardized speeds. Thus, the computer 2 knows that communication at a speed other than one of the standardized speeds can be performed.

Figure 9:
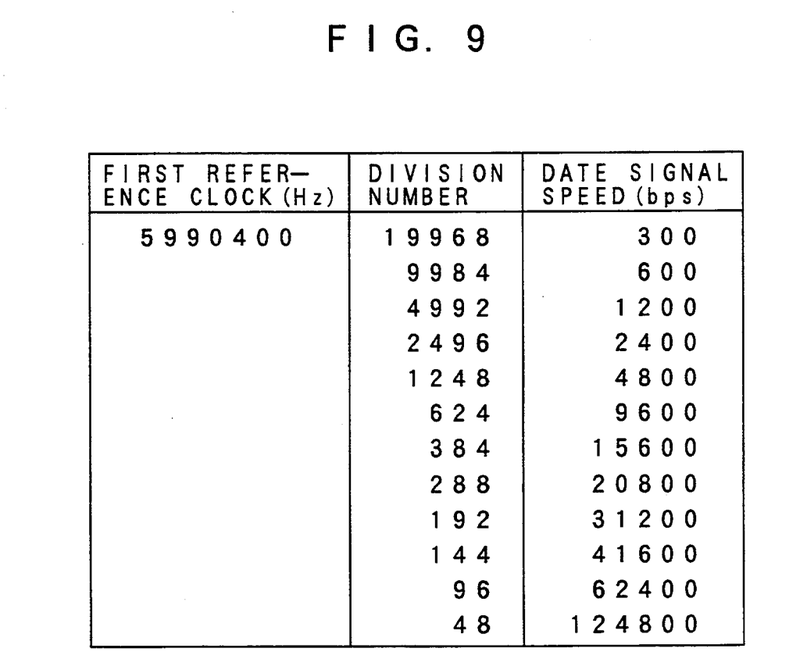
FIG. 9 is another table showing division numbers for divider 32.

Also, on receiving the signal "AT+FBPS=?", the frequency detector 28 knows that the computer 2 has the second reference clock of 124800 Hz. Therefore, the frequency detector 28 determines a desired division number using a table as shown in FIG. 9. FIG. 9 includes speeds other than the standardized speeds, that is, 15600 bps and 20800 bps. Note that the speeds other than the standardized speeds are speeds which computer 2 can use to communicate because the speeds are obtained by dividing the second reference clock by 124800 Hz.

The frequency detector 28 judges transmitting speed of communication with the computer 2 from measuring a pulse width of start bit α of a command "AT" so that it may inform the DTE interface 12 of the transmitting speed. The frequency detector 28 uses the table of FIG. 9 to obtain one of the transmitting speeds other then the standardized speeds (that is 153600 bps, 20800 bps, 31200 bps, 41600 bps, 62400 bps and 124800 bps) instead of the table of FIG. 7 which includes the standardized transmitting speeds. When, for example, the pulse width of the start bit αis 4.8 micro second, transmitting speed of the computer 2 is 20800 bps. Therefore, the frequency detector 28 gives the division number of 288 to the divider 32 in order to communicate at speed of 20800 bps. Thus, communication between the computer 2 and the modem is performed at the transmitting speed of 20800 bps.

As described above, communication between two modems is performed at the transmitting speed of 9600 bps while communication between the computer 2 and the modem is performed at the transmitting speed of 20800 bps. Note that when in communication between the two modems, data compression is used to increase data signal speed substantially, transmitting speed between the modem and the computer must be faster than the substantially increased data signal speed.

Meanwhile, when a computer has the second reference clock of 153600 Hz (the operating frequency clock of 9.8304 MHz) the signal "AT+FBPS=?" is not sent to the frequency detector 28. At that time, the frequency detector 28 is to determine a division number using the table of FIG. 7.

In this embodiment according to the present invention, since the first reference clock is a common multiple between the two second reference clocks (124800 Hz and 153600 Hz), it is easy to determine transmitting speed between the computer and the modem corresponding to the respective second reference clock.

When the computer 2 sends the question signal "AT+FBPS=?" to ask whether communication between the computer 2 and the frequency detector 28 can be performed at a speed other than the standardized speeds, and the frequency detector 28 sends an answer signal (for example, <OK>) that communication between the computer 2 and the frequency detector 28 is not performed at a speed other than the standardized speeds, the computer 2 is to communicate at speed of 9600 bps (see FIG. 3).

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. A communication device having a first reference clock which connects via a first communication line with a digital data processing device having a second reference clock and which connects with an opposite device via a second communication line, comprising:
   a) a first dividing means for dividing the first reference clock having first reference frequency according to a first division number to create a first transmitting speed clock having first transmitting frequency,
   b) a second dividing means for dividing the first reference clock having first reference frequency according to a second division number to create a second transmitting speed clock having second transmitting frequency,
   c) first line side communication means which is able to communicate digital signals with the digital data processing device at a speed determined by the first transmitting speed clock,
   d) second line side communication means which is able to modulate digital signals and demodulate modulated signals and which is able to communicate with the opposite device through the second communication line, at a speed determined by the second transmitting speed clock,
   e) the first dividing means determining the first division number with condition that the first transmitting frequency of the first transmitting speed clock is a divisor of the second reference frequency of the second reference clock and is not less than the second transmitting frequency of the second transmitting speed clock, and
   f) the second dividing means determining the second division number with condition that the second transmitting frequency of the second transmitting speed clock is equal to a frequency corresponding to one of standardized data signal communication speeds through the second communication line.

2. A communication device according to claim 1, wherein when the first reference frequency of the first reference clock is 5990400 Hz and the second reference frequency of the second reference clock is 124800 Hz, communication speed between the communication device and the digital data processing device of 20800 bps is established by selecting the first division number of the first dividing means to be 288, and communication speed between the communication device and the opposite device of 9600 bps is established by selecting the second division number of the second dividing means to be 624.

3. A communication device according to claim 1, wherein the first division number of the first dividing means is determined so that speed of the first transmitting speed clock is equal to detected transmitting speed of the digital data processing device which is detected by an incoming signal from the digital data processing device.

4. A communication device according to claim 3, wherein on receiving a question signal from the digital data processing device to ask whether communication with the digital data processing device is performed at a speed other than a standardized speed of the second communication line, the communication device sends an answer signal to show that communication therebetween is performed at a speed other than the standardized speed, said speed being a divisor of the second reference clock.

5. A communication device according to claim 1, wherein the first reference frequency of the first reference clock is selected as a common multiple of a frequency corresponding to the maximum standardized data signal speed via the second communication line and the second reference clock.

6. A communication device according to claim 5, wherein the first reference frequency of the first reference clock is selected to be 5990400 Hz, when the frequency corresponding to the maximum standardized data signal speed is 153600 Hz and the second reference frequency of the second reference clock is 124800 Hz.

7. A communication method using a communication device having a first reference clock which connects via a first communication line with a digital data processing device having a second reference clock and which connects with an opposite device via a second communication line, comprising the steps of:
a) creating and outputting a first transmitting speed clock having a first transmitting frequency by dividing the first reference clock having first reference frequency by a first division number,
b) creating and outputting a second transmitting speed clock having a second transmitting frequency by dividing the first reference clock having first reference frequency by a second division number,
c) communicating with the digital data processing device at a speed according to the first transmitting speed clock by using first line side communication means, said first line side communication means communicating digital signals with the digital data processing device at a speed determined by the first transmitting speed clock,
d) communicating with the opposite device via the second communication line at a speed according to the second transmitting speed clock by using second line side communication means, said second line side communication means being able to modulate digital signals and demodulate modulated signals and to communicate with the opposite device through the second communication line at a speed determined by the second transmitting speed clock,
e) the first division number being determined with condition that the first transmitting frequency of the first transmitting speed clock is a divisor of the second reference frequency of the second reference clock and is not less than the second transmitting frequency of the second transmitting speed clock, and
f) the second division number being determined with condition that the second transmitting frequency of the second transmitting speed clock is equal to a frequency corresponding to one of the standardized data signal communication speed through the second communication line.

8. A communication method according to claim 7, wherein when the first reference frequency of the first reference clock is 5990400 Hz and the second reference frequency of the second reference clock is 124800 Hz, communication speed between the communication device and the digital data processing device of 20800 bps is established by selecting the first division number of the first dividing means to be 288, and communication speed between the communication device and the opposite device of 9600 bps is established by selecting the second division number of the second dividing means to be 624.

9. A communication method according to claim 7, wherein the first division number is determined so that speed of the first transmitting speed clock is equal to detected transmitting speed of the digital data processing device which is detected by an incoming signal from the digital data processing device.

10. A communication method according to claim 9, wherein on receiving a question signal from the digital data processing device to ask whether communication with the digital data processing device is performed at a speed other than a standardized speed of the second communication line, the communication device sends an answer signal to show that communication therebetween is performed at a speed other than the standardized speed, said speed being a divisor of the second reference clock.

11. A communication method according to claim 7, wherein the first reference frequency of the first reference clock is selected as a common multiple of a frequency corresponding to the maximum standardized data signal speed via the second communication line and the second reference frequency of the second reference clock.

12. A communication method according to claim 11, wherein the first reference frequency of the first reference clock is selected to be 5990400 Hz, when the frequency corresponding to the maximum standardized data signal speed is 153600 Hz and the second reference frequency of the second reference clock is 124800 Hz.

* * * * *